UNITED STATES PATENT OFFICE.

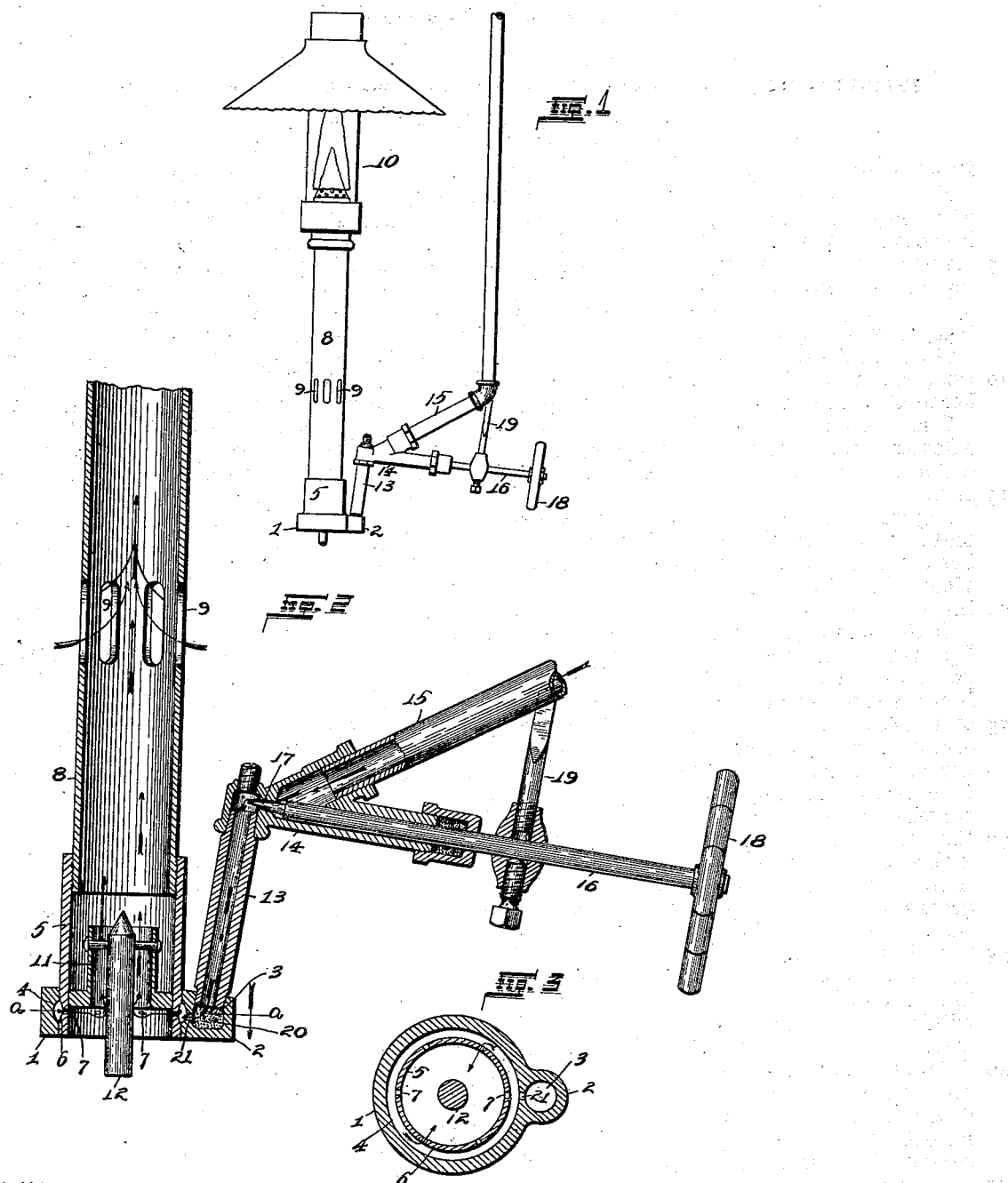

RUDOLPH A. KUMMER, OF ST. LOUIS, MISSOURI.

GAS-GENERATOR.

SPECIFICATION forming part of Letters Patent No. 694,288, dated February 25, 1902.

Application filed November 11, 1899. Serial No. 736,606. (No model.)

*To all whom it may concern:*

Be it known that I, RUDOLPH A. KUMMER, of the city of St. Louis, State of Missouri, have invented certain new and useful Improvements in Gas-Generators, of which the following is a full, clear, and exact description, reference being had to the accompanying drawings, forming a part hereof.

My invention consists of the novel construction, combination, and arrangement of parts hereinafter shown, described, and claimed.

The object of this invention is to construct a device for generating gas from gasolene and which may be used for lamps or gasolene-stoves.

Figure 1 is a side view of my complete generator, shown used with an ordinary Welsbach burner. Fig. 2 is a vertical sectional view. Fig. 3 is a horizontal sectional view taken on the line *a a* of Fig. 2.

In the construction of the device, as shown, I provide a metallic ring 1, having an integral projection 2, containing a socket 3. The inner face of the ring 1 is provided with a circular groove 4. In this ring 1 is fitted a generator-tube 5, provided with an annular groove 6 in communication with the groove 4, formed in the ring 1, thereby producing a chamber to receive oil or gas generated from the oil. Said generator-tube 5 is provided with a plurality of jet-apertures 7, extending therethrough and communicating with the grooves 4 and 6. Mounted in the generator-tube 5 and extending above it is a mixing-tube 8, which may be of any desirable length and is provided with a plurality of slots 9 for the entrance of air to mix with the rising gas within said mixing-tube, which is delivered to the burner 10. Within the generator-tube 5, immediately above the jet-apertures 7, I place a nipple 11, extended vertically a short distance, and in the nipple is suspended a metallic pendant 12. This pendant serves to restrict the passage-way in the nipple 11, so as to retard the flow of air into the open lower end of the nipple, and thus prevent the commingling of sufficient air with the gas to cause complete combustion within the generator.

Within the socket 3 is a pipe 13, to the upper end of which the valve-housing 14 is connected. The valve-housing receives the connection of a gasolene-supply pipe 15, and the valve is operated by the stem 16 of ordinary construction, provided at its end with a needle 17 for controlling the passage of the gasolene into the pipe 13. Said stem 16 is provided with the hand-wheel 18, and on the stem is placed a stop 19 to limit the rotation of the valve-stem and regulate the flow of gasolene past the valve 17 into the pipe 13. This is done by means of the stop 19 when said valve is open coming in contact with the pipe 15 and preventing said valve from being further opened. Within the socket 3 beneath the pipe 15 is placed filtering material 20, through which the gas or gasolene must pass before being allowed to pass through the aperture 21, communicating with said socket and grooves 4 and 6, thereby filtering the gasolene and taking therefrom all foreign substance and also preventing the clogging of said aperture 21.

As shown in Fig. 1, my generator may be used with an ordinary Welsbach burner. It may also be applied to a stove, in which use it is obviously necessary to construct it of larger form.

The operation of the device is as follows: The pipe 15 is connected with an ordinary gasolene-supply tank and gasolene is allowed to pass into the valve-housing 14 when the valve 17 is unseated. The gasolene is allowed to pass the valve 17 into the pipe 13 and through the filtering material 20 and the aperture 21 into the space formed by the grooves 4 and 6 and then through the plurality of jet-apertures 7 into the interior of the nipple 11. The gasolene is then ignited and by reason of the jet-apertures 7 being of small diameter jets of blue flame are produced that strike the pendant 12. The gasolene which escapes through the apertures 7 is immediately generated into gas. The jets being located within the burner and at a point above the lower extremity thereof, there is no opportunity for a sufficient mixing of oxygen with the jets for complete combustion, and the result is that the unconsumed vapor readily ascends through the mixing-tube to the burner at the upper end thereof. The burner is then lighted, and while the same is continually burning the gasolene escaping through the jet-apertures 7 also burns continually. By the continuous burning of the gas in the generator at the jet-apertures 7 the pendant, ring, and nipple become very hot and the gasolene entering the space formed by the grooves 4 and 6 is constantly converted into gas.

I claim as my invention—

1. A device of the class described, comprising a generator-tube open at its lower end for the entrance of air, an oil and gas chamber having jet-apertures leading therefrom into the interior of the generator-tube above the lower extremity thereof, a mixing-tube surmounting said generator, a burner located at the upper end of said mixing-tube, and means for partly closing the lumen of the generator-tube, substantially as described.

2. A device of the class described comprising a generator-tube open at its lower end for the entrance of air and containing an oil and gas chamber having jet-apertures leading therefrom into the interior of the generator-tube above the lower extremity thereof, a nipple located within said generator-tube above said jet-apertures, a mixing-tube surmounting said generator-tube, and a burner located at the upper end of said mixing-tube, substantially as described.

3. The combination of a ring having an inner annular groove, a generator-tube having an annular groove positioned opposite the groove in said ring, said generator-tube being provided with apertures leading from said grooves to the interior of the generator-tube, means through which gasolene is conducted to said grooves, a nipple, a pendant, and a mixing-tube carrying a burner, substantially as described.

4. A gas-generator comprising a ring provided with an annular groove, a generator-tube carried by said ring, and having apertures communicating with said groove, a pendant suspended within said generator-tube, and a mixing-tube.

5. A gas-generator comprising a ring provided with a groove, and apertures, a generator-tube placed in said ring, and having a groove communicating with the groove in said ring, the apertures formed through said generator-tube communicating with both of said grooves, a nipple mounted within the generator-tube and positioned immediately above said apertures, a pendant suspended within the nipple, a mixing-tube mounted upon said generator-tube and communicating with the burner, a valve mechanism communicating with said ring, and means for regulating the flow of fuel within said ring.

In testimony whereof I affix my signature in presence of two witnesses.

RUDOLPH A. KUMMER.

Witnesses:
ALFRED A. EICKS,
J. D. RIPPEY.